(12) United States Patent
Highgate et al.

(10) Patent No.: US 7,318,888 B2
(45) Date of Patent: Jan. 15, 2008

(54) METHOD OF PHOTOELECTROLYSIS

(75) Inventors: Donald James Highgate, Surrey (GB); Jonathan Anthony Lloyd, Lincs (GB)

(73) Assignee: ITM Power Ltd, Stamford (GB)

( * ) Notice: Subject to any disclaimer, the term of this patent is extended or adjusted under 35 U.S.C. 154(b) by 0 days.

(21) Appl. No.: 11/176,769

(22) Filed: Jul. 7, 2005

(65) Prior Publication Data
US 2007/0017794 A1    Jan. 25, 2007

Related U.S. Application Data

(63) Continuation of application No. 10/370,339, filed on Feb. 19, 2003, now abandoned.

(30) Foreign Application Priority Data
Feb. 20, 2002  (GB)  ................................ 0204028.5

(51) Int. Cl.
*C25C 1/00* (2006.01)
*C25C 1/02* (2006.01)
*B01D 17/06* (2006.01)
*C02F 1/146* (2006.01)

(52) U.S. Cl. ...................... 205/340; 205/687; 205/746; 205/763; 205/770; 205/628

(58) Field of Classification Search ................ 205/340, 205/687, 746, 763, 770, 628
See application file for complete search history.

(56) References Cited

U.S. PATENT DOCUMENTS

| 4,036,788 | A  |   | 7/1977  | Steckler |  |
|-----------|----|---|---------|----------|--|
| 4,511,638 | A  |   | 4/1985  | Sapru et al. |  |
| 5,137,607 | A  |   | 8/1992  | Anderson et al. |  |
| 5,997,717 | A  | * | 12/1999 | Miyashita et al. | 205/466 |
| 6,074,546 | A  | * | 6/2000  | Sun et al. | 205/655 |
| 6,616,815 | B2 | * | 9/2003  | Kato et al. | 204/158.21 |
| 2002/0130030 | A1 |   | 9/2002  | Kato et al. |  |

FOREIGN PATENT DOCUMENTS

| EP | 1 085 051 A1  | 3/2001  |
| JP | 2001286749 A  | 10/2001 |
| SU | 960314        | 9/1982  |
| WO | WO 80/00353 A1 | 3/1980  |
| WO | WO 98/45503 A1 | 10/1998 |
| WO | WO 01/49824 A2 | 3/2001  |
| WO | WO 01/47054 A1 | 6/2001  |

* cited by examiner

*Primary Examiner*—Edna Wong
(74) *Attorney, Agent, or Firm*—Saliwanchik, Lloyd & Saliwanchik

(57) ABSTRACT

A method for the photoelectrolysis of a liquid or gaseous species, comprises irradiating an ion exchange membrane of a membrane electrode assembly, wherein the membrane is an optically transparent material and comprises the species.

12 Claims, 2 Drawing Sheets

METHOD OF PHOTOELECTROLYSIS

This application is a continuation application of U.S. application Ser. No. 10/370,339, filed Feb. 19, 2003, now abandoned; which claims priority to Great Britain Application No. 020428.5, filed Feb. 20, 2002.

FIELD OF THE INVENTION

This invention relates to a method of photoelectrolysis, in particular a method for the photoelectrolysis of water.

BACKGROUND OF THE INVENTION

A photoelectrolytic cell is one in which radiant energy causes a net chemical transformation in the cell. Of particular interest are photoelectrolytic cells suitable for carrying out the photodissociation of water, forming hydrogen and oxygen at the cathode and anode respectively. Water can be photodissociated using a high energy light source (such as a laser beam) in the presence of a catalyst (such as titanium dioxide) and a separating medium which prevents the recombination of the products.

Conventional photoelectrolytic cells are typically arranged in a plane parallel configuration, with irradiation of the electrolyte occurring indirectly, i.e. the incident light passing through an electrode to reach the electrolyte. Should the photoelectrolytic reaction produce a gas, the gas will generate around an electrode, bubbling out of the electrolyte. As a result of this, the entry of additional light is impeded. This problem has been partly addressed by making the electrodes transparent and introducing any catalyst as a colloidal dispersion in the electrolyte, the aim being to reduce unwanted absorption. The presence of bubbles has been accepted as inevitable.

In a photoelectrochemical cell, a current and a voltage are simultaneously produced upon absorption of light by one or more electrodes. A specific type of photoelectrochemical cell is a photovoltaic cell, which is a solid state device, usually a semiconductor such as silicon. The device absorbs photons with energies greater than or equal to the bandgap energy, simultaneously producing electric power.

An electrolytic cell is one in which the input of electrical energy results in a net chemical transformation in the cell. A common feature of conventional electrolytic cells is that a substantial input of electrical energy is required to drive the electrolytic reaction at a sufficient rate. This expenditure of electrical energy reduces the efficiency of the cell.

Electrochemical cells, in particular electrolytic cells, may be in the form of a membrane electrode assembly (MEA). MEAs typically have a multi-layered structure comprising (i) an Ion Exchange Membrane (IEM), (ii) a current-collecting electrode, and (iii) an electro-catalyst layer on each side.

PCT/GB02/04095 describes a composite MEA formed by an in situ polymerisation process. This Application further describes an MEA having an improved reaction interface.

SUMMARY OF THE INVENTION

The present invention addresses the need for an efficient method of photoelectrolysis. Photoelectrolysis may be effected solely by radiant energy, or by the simultaneous input of radiant and electrical energies.

According to the invention, a method for the photoelectrolysis of a liquid or gaseous species comprises irradiating an ion exchange membrane of a membrane electrode assembly. The method may further comprise forming an electric field across the membrane. The membrane is an optically transparent material, preferably a polymer comprising a strongly ionic group, and comprises the species. The assembly preferably comprises a catalyst of the electrolytic reaction. Any gaseous product(s) may be removed by applying a pressure differential to the system.

A method of the invention involves the use of an MEA having an optically transparent membrane. Judicious selection of the membrane material may allow the direct photoelectrolysis of the species, increasing the efficiency of the operation. In particular, a method of the invention may be used for the photoelectrolysis of water, producing hydrogen and oxygen. This may allow cost-effective production of hydrogen fuel from a renewable energy source.

DESCRIPTION OF THE PREFERRED EMBODIMENTS

The MEA comprises an optically transparent IEM, for example a proton exchange membrane (PEM). The membrane is irradiated with high-energy (e.g. UV or white light) photons to yield activation of the species. The collision with a photon may change the state of excitation of the species. In the excited state of the species, the removal of the outer electrons, and thus the creation of residual cations, is performed more easily. An assembly comprising a suitable catalyst may, if the irradiated photons are of sufficient energy, allow direct dissociation of water to hydrogen and oxygen without significant electrical energy input. This may increase the efficiency of the photoelectrolytic operation.

The membrane is preferably irradiated directly (i.e. not through an electrode), so that any gaseous product generated at that electrode will not interfere with the passage of light through the membrane.

Photoelectrolysis may be augmented by applying a potential difference across the membrane to produce an electric field. The relative proportion of photonic and electrical input energies may be varied. This may increase the efficiency and reduce costs such as those resulting from the quantity and type of catalyst used.

The membrane material is optically transparent, preferably optically clear. The material may be transparent to photons, e.g. high energy, visible or UV radiation. It is preferably malleable, so that it can formed into shapes which focus, concentrate and direct light as desired. Thus, for example, the MEA may be in the form of a light waveguide or lens.

The membrane material preferably comprises a polymer which includes a strongly ionic group. Optically transparent polymers may be formed by the polymerisation of monomers which include monomers such as hydroxyethyl methacrylate, acrylonitrile, methyl methacrylate and/or vinyl pyrrolidone.

The material may be formed by the copolymerisation of monomers which include an electrically active comonomer. The electrically active component can be based either upon an acid, e.g. a sulphonic acid ($SO_3$), phosphoric or phosphonic acid, or an alkali (OH), e.g. KOH or NaOH or ammonium hydroxide. If electrically inactive comonomers are used, the material may be rendered electrically active by introducing strongly ionic molecules, for example using a swelling liquid technique.

The polymer is preferably hydrophilic, such that it is inherently able to absorb and transmit water throughout its molecular structure. Hydrophilic polymers can typically be formed by the copolymerisation from solution of a monomer mixture normally consisting of a hydrophobic/structural comonomer and a hydrophilic comonomer. The polymer is preferably cross-linked for greater stability. Cross-linked materials may be formed by applying ionising radiation to the material or by using a cross-linking agent. The use of additional cross-linking agents allows the final water uptake to be controlled separately from the electrical properties.

The assembly may comprise a catalyst of the photoelectrolytic reaction. A preferred catalyst system is platinum/ruthenium deposited onto colloidal $TiO_2$. A desensitiser such as ruthenium (II) tris(2,2'-bipyridine)dichloride hexahydrate ($Ru(bpy)_3^{2+}$), iodine or an iron complex with a suitable quenching compound (e.g. methyl violagen) may be used with the catalyst. Any catalyst is preferably disposed on or near an electrode. An electrode may be translucent, transparent (e.g. a tin oxide glass) or of an "open-weave" construction, to allow the transmission of photons through the electrode to reach the membrane. A carbon fabric may be used as an electrode, and the fabric may be impregnated with a layer of catalyst. The assembly may be in the form of a stack of individual MEAs.

Where the MEA is used for the photoelectrolysis of water under alkaline conditions, preferred catalysts include, for the production of hydrogen, Raney Ni supported on Ti or a Ni/Sn electrocatalyst (preferably of an overpotential of less than 100 mV at 0.3 $Å/cm^2$) and, for the production of oxygen, $La_{0.7}Sr_{0.3}Co_{0.9}Fe_{0.1}O_3$ and $LaNiO_3$. Other suitable catalysts will be apparent to those of ordinary skill in the art.

Further information regarding suitable materials and processes for the formation of MEAs may be found in PCT/GB02/04095.

The invention will now be described by way of example only with respect to the accompanying drawings which are each schematic views of a MEA as used in the invention.

Figure 1:
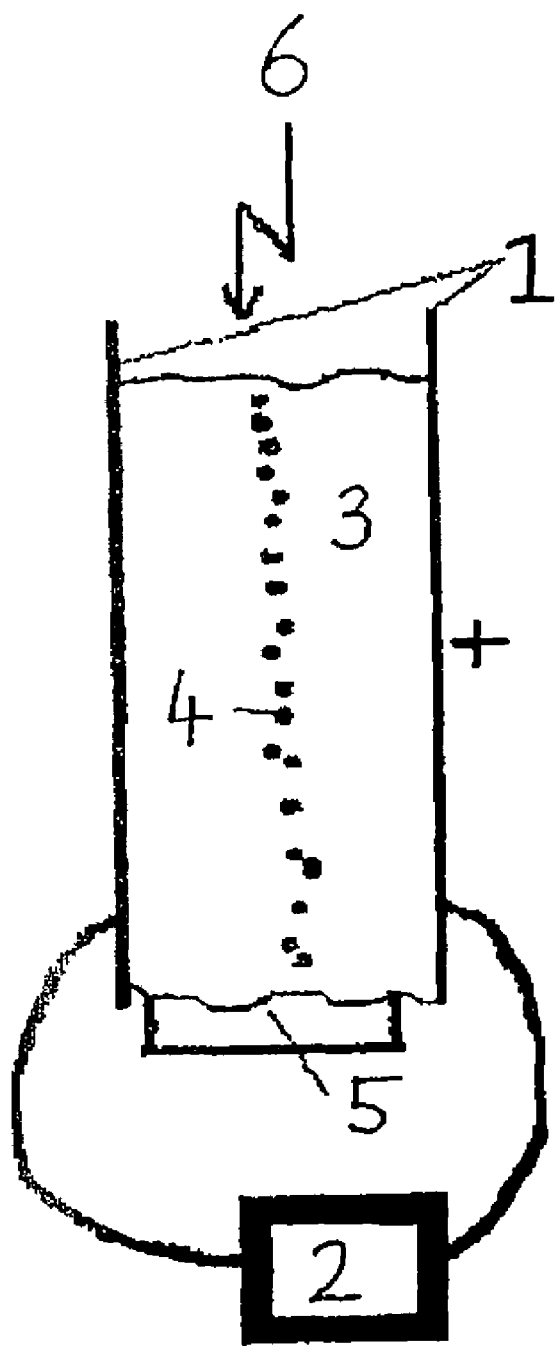
FIG. 1 shows an MEA suitable for effecting the photoelectrolysis of the water.

In use, a voltage is applied between electrodes 1 using generator 2, producing an electric field across the membrane 3. A container 5 containing water is present at the bottom of the membrane such that water is absorbed into the membrane. The membrane is irradiated with high-energy photons 6 causing dissociation of the water to form hydrogen and oxygen at the cathode (−) and anode (+) respectively. The anode is translucent, transparent or of an "open-weave" structure, allowing photons to pass through it and into the membrane.

Figure 2:
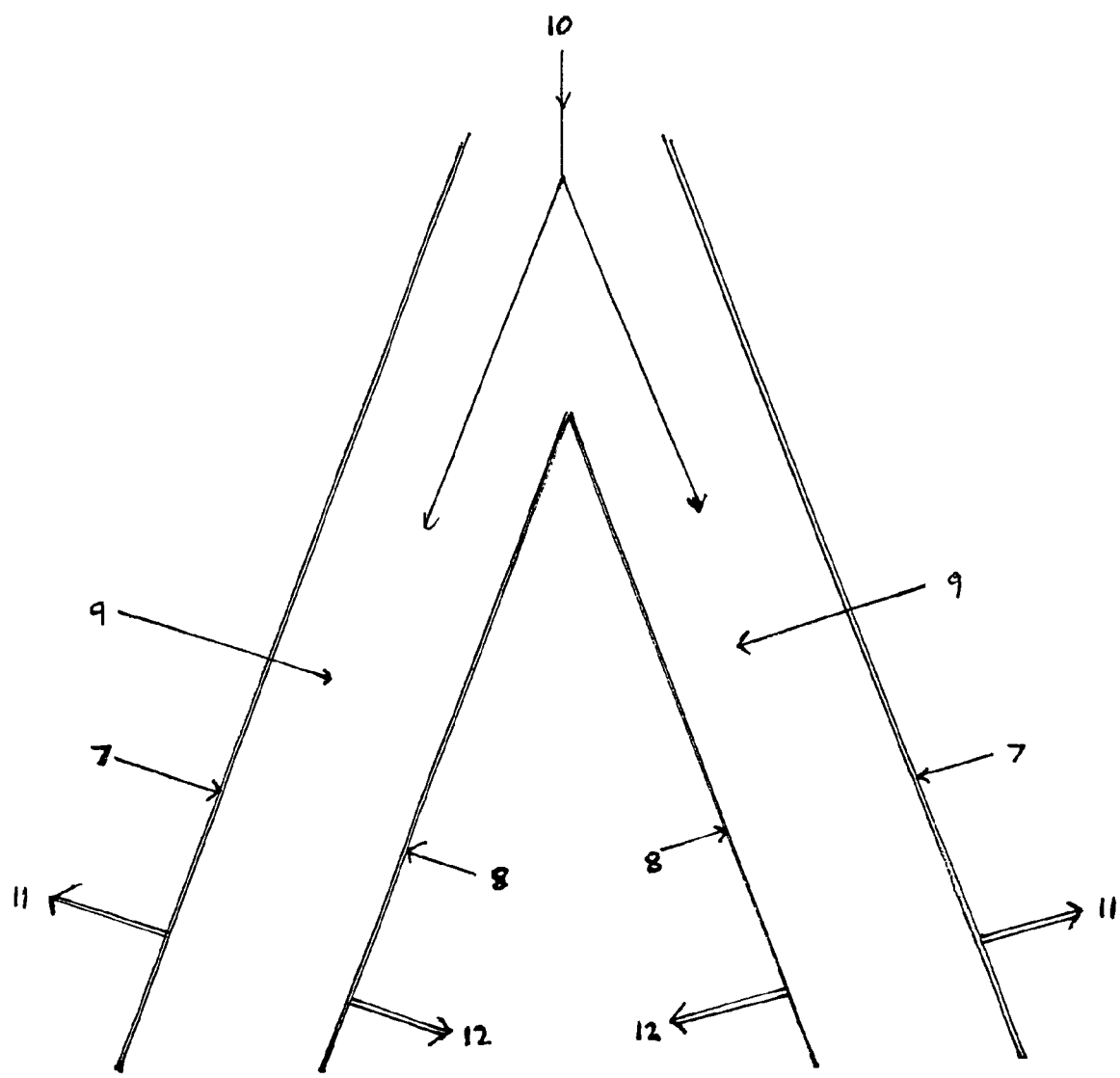
FIG. 2 shows a plan view of an MEA of the invention suitable for the photodisassociation of water. water. The MEA comprises a membrane 3 disposed between electrodes 1. Disposed throughout the membrane is a titanium oxide catalyst 4.

FIG. 2 is a plan view of an MEA of the invention suitable for the photodissociation of water, the assembly arranged in a "hollow conical" geometry. The outer surfaces 7 and inner surfaces 8 of the "cone" each comprise an electrode/catalyst layer separated by a transparent membrane (9).

The membrane is irradiated directly at the apex of the cone, the light path 10 focused if necessary (e.g. with a lens). Gaseous products are generated at the inner and outer surfaces of the assembly and may be removed (as shown by the arrows 11 and 12) by applying a pressure differential to the MEA.

We claim:

1. A method for the photoelectrolysis of a liquid or gaseous species, which comprises directly irradiating with photons an ion exchange membrane of a membrane electrode assembly, wherein the membrane is an optically transparent material and comprises the species, wherein said membrane electrode assembly is a light waveguide, and wherein the membrane is directly irradiated with the photons via the waveguide, thereby causing photoelectrolysis of the liquid or gaseous species.

2. The method, according to claim 1, wherein the material is a polymer comprising a strongly ionic group.

3. The method, according to claim 2, wherein the polymer is hydrophilic.

4. The method, according to claim 2, wherein the polymer is cross-linked.

5. The method, according to claim 1, wherein the material is malleable.

6. The method, according to claim 1, wherein the species is water.

7. The method, according to claim 1, wherein the assembly is a stack.

8. The method, according to claim 1, which further comprises forming an electric field across the membrane.

9. The method, according to claim 1, wherein the assembly comprises a catalyst of photoelectrolysis.

10. The method, according to claim 9, wherein the catalyst comprises platinum and ruthenium.

11. The method, according to claim 1, wherein the assembly is a hollow cone whose outer and inner surfaces each comprise an electrode/catalyst layer and are separated by said optically transparent membrane.

12. The method, according to claim 1, which additionally comprises removing gaseous products by applying a pressure differential to the assembly.

* * * * *